United States Patent
Song et al.

(10) Patent No.: US 9,708,217 B2
(45) Date of Patent: Jul. 18, 2017

(54) REFRACTORY COATING COMPOSITION INCLUDING NOVEL HEAT-RESISTANT MATERIALS

(71) Applicant: BOVIA, INC., Carrollton, TX (US)

(72) Inventors: Myong-Shin Song, Samcheok-si (KR); Seung-Min Kang, Gangneung-si (KR); Hyeon-Jin Song, Seoul (KR); Do-Hyun Kim, Seoul (KR)

(73) Assignee: Bovia, Inc., Carrollton, TX (US)

( * ) Notice: Subject to any disclaimer, the term of this patent is extended or adjusted under 35 U.S.C. 154(b) by 0 days.

(21) Appl. No.: 15/102,954

(22) PCT Filed: Oct. 27, 2015

(86) PCT No.: PCT/KR2015/011395
§ 371 (c)(1),
(2) Date: Jun. 9, 2016

(87) PCT Pub. No.: WO2016/163611
PCT Pub. Date: Oct. 13, 2016

(65) Prior Publication Data
US 2017/0121224 A1    May 4, 2017

(30) Foreign Application Priority Data
Apr. 9, 2015 (KR) ........................ 10-2015-0050304

(51) Int. Cl.
| | | |
|---|---|---|
| *C04B 14/20* | (2006.01) | |
| *C04B 28/08* | (2006.01) | |
| *C04B 18/08* | (2006.01) | |
| *C04B 14/28* | (2006.01) | |
| *C04B 111/28* | (2006.01) | |

(52) U.S. Cl.
CPC ............ *C04B 14/20* (2013.01); *C04B 14/202* (2013.01); *C04B 14/28* (2013.01); *C04B 18/08* (2013.01); *C04B 28/08* (2013.01); *C04B 2111/28* (2013.01)

(58) Field of Classification Search
CPC ......... C04B 14/04; C04B 14/20; C04B 14/28; C04B 18/06; C04B 14/202; C04B 2111/28
See application file for complete search history.

(56) References Cited

U.S. PATENT DOCUMENTS

| | | | | |
|---|---|---|---|---|
| 5,772,751 A | * | 6/1998 | Nisnevich | ............ C04B 18/027 106/672 |
| 2010/0160495 A1 | * | 6/2010 | Teramoto | ................. C09D 5/02 523/400 |
| 2014/0216653 A1 | * | 8/2014 | Wu | .......................... C04B 28/02 156/325 |

FOREIGN PATENT DOCUMENTS

| | | |
|---|---|---|
| JP | H11116357 A | 4/1999 |
| JP | 2006182628 A | 7/2006 |
| KR | 20010056000 A | 7/2001 |
| KR | 100525564 B1 | 10/2005 |
| KR | 20090084773 A | 8/2009 |
| KR | 20100079863 A | 7/2010 |
| KR | 100992888 B1 | 11/2010 |
| KR | 1020110108075 A | 10/2011 |
| KR | 20140100674 A | 8/2014 |

OTHER PUBLICATIONS

Derwent-Acc-No. 2013-G82992, abstract of Chinese Patent Specification No. CN 102898094 A (Jan. 2013).*
Derwent-Acc-No. 2013-H84126, abstract of Chinese Patent Specification No. CN 102924032 A (Feb. 2013).*
Derwent-Acc-No. 2014-W57446, abstract of Chinese Patent Specification No. CN 104058696 A (Sep. 2014).*
ISA Korean Intellectual Property Office, International Search Report and Written Opinion Issued in Application No. PCT/KR2015/013395, Feb. 4, 2016, WIPO, 10 pages. (English Language Version of Search Report Included).

* cited by examiner

*Primary Examiner* — Anthony J Green
(74) *Attorney, Agent, or Firm* — Alleman Hall Creasman & Tuttle LLP

(57) ABSTRACT

Disclosed is a refractory coating composition, which includes: based on the total weight of the composition, (a) 20 to 40 wt % of cement, (b) 15 to 40 wt % of ground-granulated blast-furnace slag, (c) 5 to 20 wt % of at least one selected from among mica and alumina, (d) 0 to 10 wt % of flyash from a fluidized-bed boiler, (e) 10 to 40 wt % of expanded vermiculite, (f) 10 to 30 wt % of at least one selected from among calcium carbonate and limestone, and (g) 0.5 to 20 wt % of a thickening agent, and which also has a predetermined porosity and thus an appropriate density, is non-shrinkable to thus reduce cracking due to shrinkage, and exhibits drastically increased resistance to heat in the event of a fire.

4 Claims, 3 Drawing Sheets

REFRACTORY COATING COMPOSITION INCLUDING NOVEL HEAT-RESISTANT MATERIALS

TECHNICAL FIELD

The present invention relates to a refractory coating composition including novel heat-resistant materials and, more particularly, to a sprayable refractory coating composition that includes industrial byproducts having excellent heat resistance at high temperatures.

BACKGROUND ART

With increasing population densities, the height and size of buildings are increasing. To this end, steel structures are used in most large high-rise buildings.

In the event of a fire, however, large high-rise buildings pose a high risk of personal injury due to toxic gases, and the strength and bearing capacity of steel structures thereof are decreased due to heat and may thus be vulnerable to collapse owing to the weight of the building. With the goal of solving these problems, methods of forming a refractory coating layer on the outer surface of such a steel structure have been adopted.

Specifically, low-carbon steel for use in constructing steel structures has a critical temperature of about 540° C., and the bearing capacity of the structures is decreased to about 60% at temperatures higher than the critical temperature. Hence, in order to maximally prevent the bearing capacity of the steel structures from decreasing and personal injury from occurring in the event of a fire, the steel structures are subjected to refractory coating. Also, concrete structures are required to resist explosive spalling and degradation of concrete materials attributable to heat for a predetermined period of time. Furthermore, refractory coating is performed to ensure that the original properties of the concrete structures are retained even after the fire is extinguished.

Conventional refractory adiabatic coating materials are composed mainly of asbestos and rockwool, asbestos being a known carcinogen, of which the worldwide use thereof has almost completely stopped, and inorganic fibrous rockwool generating large amounts of dust upon construction, undesirably creating a poor construction environment for workers and contaminating the surrounding environment.

Rockwool-based refractory coating material is favorable in terms of low specific gravity and superior fire resistance, but requires proficiency in order to construct it at an appropriate density so as to satisfy desired fire resistance and strength, and entails difficulties in maintaining a stable slurry (suspension). Furthermore, problems such as peeling of the coating material and scattering of inorganic fibrous rockwool may occur over time after construction.

In order to overcome the above problems, compositions containing a variety of expanded natural minerals, such as vermiculite and perlite, have been developed for preparation of the slurry (suspension), but the expanded natural minerals have numerous surface pores, making it difficult to control open pores by changing viscosity upon construction through spraying using the slurry mixed with water.

Hence, materials for solving the above problems are being developed and introduced, but most techniques emphasize initial adhesion, adhesive strength, etc., and methods of retaining durability or resistance to flames at high temperatures in the event of a fire for a predetermined period of time have not yet been devised.

Korean Patent Application Publication No. 10-2011-0108075 discloses a method of increasing heat resistance at high temperatures in the event of a fire using foamed ash and foamed perlite. Although this technique is based on a mechanism whereby an increase in temperature is delayed by the use of the foamed material, the foamed material has open pores and thus the effect of blocking heat is insignificant due to the presence of the pores.

Also, Korean Patent No. 10-0992888 discloses a method of using gypsum and waste concrete powder as industrial inorganic byproducts. However, this patent is based on a mechanism in which the pores inside the refractory coating material are controlled so as to block heat, rather than an improvement in heat resistance at high temperatures, and thus basic solutions for ensuring heat resistance are still lacking.

CITATION LIST

Patent Literature (Patent Document 1) Korean Patent Application Publication No. 10-2011-0108075

(Patent Document 2) Korean Patent No. 10-0992888

DISCLOSURE

Technical Problem

Accordingly, the present invention has been made keeping in mind the above problems encountered in the related art, and an object of the present invention is to provide a refractory coating composition that has a predetermined porosity and thus an appropriate density, is non-shrinkable and thus cracks less due to shrinkage, and has drastically increased resistance to heat in the event of a fire.

Technical Solution

The present invention provides a refractory coating composition, comprising: based on the total weight of the composition, (a) 20 to 40 wt % of cement, (b) 15 to 40 wt % of ground-granulated blast-furnace slag, (c) 5 to 20 wt % of at least one selected from among mica and alumina, (d) 0 to 10 wt % of flyash from a fluidized-bed boiler, (e) 10 to 40 wt % of expanded vermiculite, (f) 10 to 30 wt % of at least one selected from among calcium carbonate and limestone, and (g) 0.5 to 20 wt % of a thickening agent.

Advantageous Effects

According to the present invention, the refractory coating composition is configured such that the amount of cement is remarkably decreased and ground-granulated blast-furnace slag, flyash from a fluidized-bed boiler, mica and/or alumina, and expanded vermiculite are combined, thereby ensuring a predetermined porosity and thus an appropriate density, exhibiting resistance to shrinkage to thus reduce cracking due to shrinkage, and drastically increasing resistance to heat in the event of a fire.

According to the present invention, the refractory coating composition is applied on steel structures or cement structures, whereby the structures can continuously block heat and flames even when exposed to flames at high temperatures for a long period of time, remarkably preventing the durability of steel structures or cement structures from decreasing.

BEST MODE

Figure 1:
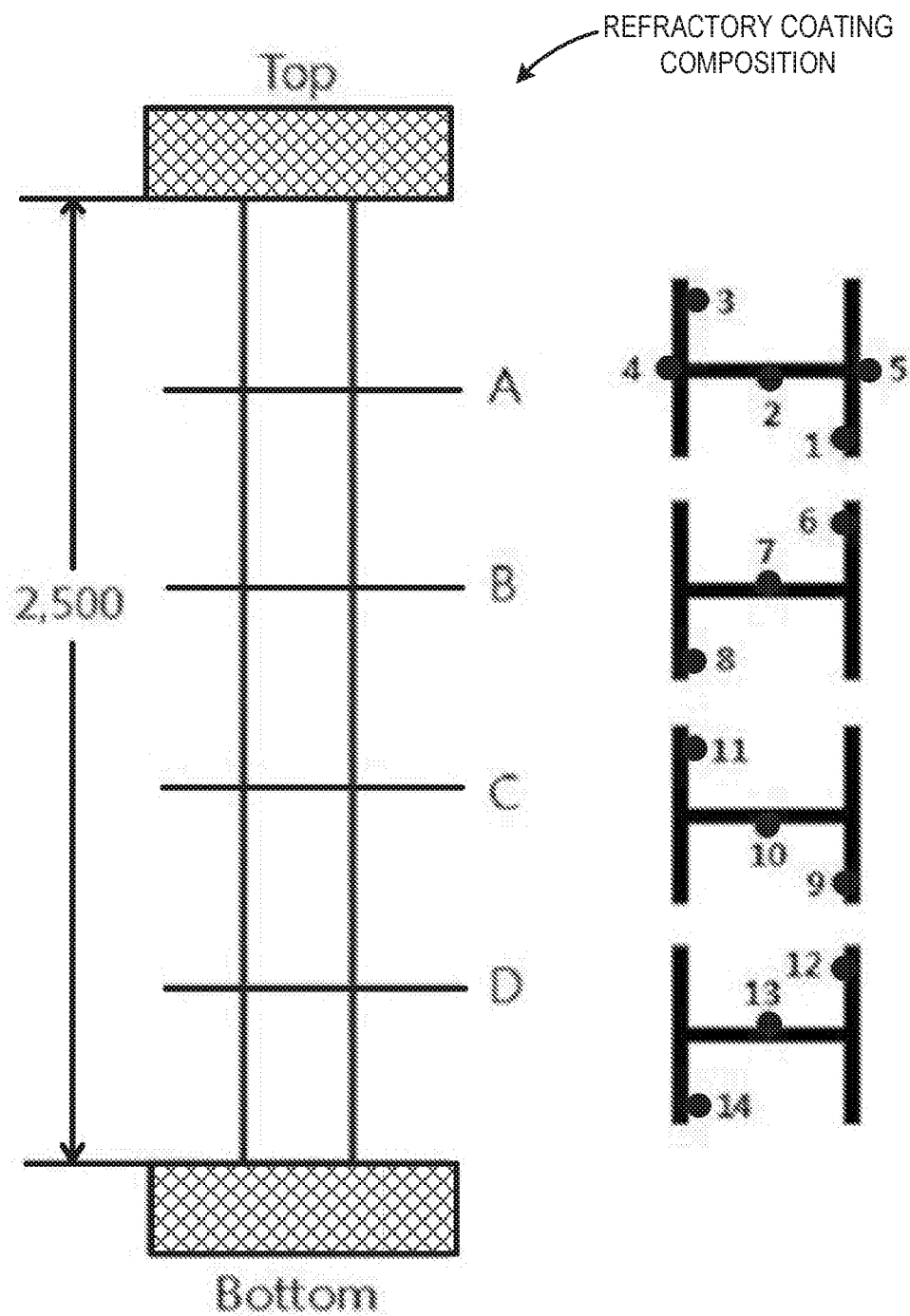
FIG. 1 schematically illustrates a steel structure for use in testing the refractory coating composition according to the present invention.

The present invention addresses a refractory coating composition, comprising: based on the total weight of the composition, (a) 20 to 40 wt % of cement, (b) 15 to 40 wt % of ground-granulated blast-furnace slag, (c) 5 to 20 wt % of at least one selected from among mica and alumina, (d) 0 to 10 wt % of flyash from a fluidized-bed boiler, (e) 10 to 40 wt % of expanded vermiculite, (f) 10 to 30 wt % of at least one selected from among calcium carbonate and limestone, and (g) 0.5 to 20 wt % of a thickening agent.

In the present invention, the use of cement, expanded vermiculite, limestone, a thickening agent such as methyl cellulose, polyvinyl alcohol or pulp cellulose, a foaming agent, etc. is similar to conventional techniques for refractory coating materials.

However, the refractory coating composition according to the present invention is significantly different from conventional techniques because cement is used in a remarkably decreased amount (about 50 wt %) and because it contains ground-granulated blast-furnace slag, discharged as a byproduct of high-temperature thermal treatment, and flyash from a fluidized-bed boiler, discharged as a byproduct of high-temperature desulfurization.

In the present invention, the ground-granulated blast-furnace slag and the flyash from a fluidized-bed boiler may function to drastically increase pyrolysis resistance of the refractory coating composition at high temperatures in the event of a fire, and to prevent heat from being conducted to steel structures or cement structures coated with the refractory coating material, thereby maintaining the durability of the steel structures or cement structures.

Compared to conventional techniques, the refractory coating composition according to the present invention includes at least one selected from among mica and alumina as the heat-resistant material, thus improving the heat resistance of the refractory coating composition at high temperatures. When mica and/or alumina, which have high heat resistance at high temperatures, are used, the pyrolysis resistance of the refractory coating composition may be remarkably increased at high temperatures in the event of a fire, and heat may be prevented from being conducted to steel structures or cement structures coated with the refractory coating material, whereby the durability of the steel structures or cement structures may be maintained.

The constituents of the refractory coating composition according to the present invention are specified below.

The kind of cement in (a) is not particularly limited, and those known in the art may be used without limitation. Unless otherwise mentioned, typical Portland cement may be adopted.

The cement is preferably used in an amount of 20 to 40 wt % based on the total weight of the composition. If the amount of cement is less than 20 wt %, the resulting composition may exhibit poor adhesion. On the other hand, if the amount thereof exceeds 40 wt %, the amounts of the other refractory materials may become insufficient, undesirably deteriorating the fire resistance of the composition.

The ground-granulated blast-furnace slag in (b) is slag obtained by quenching slag, discarded from a blast furnace of an ironworks, with water, and is used as a heat-resistant binding material.

The ground-granulated blast-furnace slag preferably has a fineness of 3,300 to 6,200 $cm^2/g$, and more preferably 3,800 to 4,800 $cm^2/g$. If the fineness of the blast-furnace slag is less than 3,300 $cm^2/g$, there are no heat resistance problems but the hydration of cement as a binder may be inhibited, undesirably weakening the initial bonding strength of the refractory coating material. On the other hand, if the fineness thereof exceeds 6,200 $cm^2/g$, the hydration of cement may be overly promoted due to the strong initial reaction, undesirably deteriorating the adhesion of the refractory coating material.

The ground-granulated blast-furnace slag may be used in an amount of 15 to 40 wt % based on the total weight of the composition. If the amount of the ground-granulated blast-furnace slag is less than 15 wt %, the strength of adhesion may decrease 28 days after construction of the refractory coating material. On the other hand, if the amount thereof exceeds 40 wt %, expression of the strength of adhesion is delayed until 3 days after construction of the refractory coating material, undesirably causing peeling of the coating material.

Also, at least one selected from among mica and alumina in (c) is used as a heat-resistant additive.

The mica may include any one or a combination selected from among muscovite and phlogopite as natural minerals, and preferably contains 30 to 50 wt % of a silica component and 10 to 40 wt % of an alumina component. If the amount of the silica component exceeds 50 wt % and the amount of the alumina component is 40 wt % or less, heat resistance may decrease. On the other hand, if the amount of the silica component is 50 wt % or less and the amount of the alumina component exceeds 40 wt %, the price is increased, thus negating economic benefits. Hence, the amounts of the silica component and the alumina component preferably fall in the ranges of 35 to 40 wt % and 20 to 30 wt %, respectively.

The alumina preferably contains 80 to 95 wt % of a pure alumina component.

At least one selected from among mica and alumina is used in an amount of 5 to 20 wt % based on the total weight of the composition. If the amount of the above constituent is less than 5 wt %, fire resistance may decrease. On the other hand, if the amount thereof exceeds 40 wt %, the strength of adhesion may decrease 28 days after construction of the refractory coating material.

The flyash from a fluidized-bed boiler in (d) is flyash discharged as a byproduct of desulfurization from a fluidized-bed boiler at a high temperature, and is used as a heat-resistant adjuvant in the present invention.

The flyash from a fluidized-bed boiler is composed of 30 to 60 wt % of a pure calcium oxide component, 30 to 60 wt % of an anhydrite component, and 5 to 15 wt % of an additional component, other than the above components. If the amount of the pure calcium oxide component is less than 30 wt % and the amount of the anhydrite component exceeds 60 wt %, the heat resistance of the refractory coating material may decrease. On the other hand, if the amount of the pure calcium oxide component exceeds 60 wt % and the amount of the anhydrite component is less than 30 wt %, the initial hydration of calcium oxide may be carried out too vigorously, undesirably causing temporary condensation of the refractory coating material. Preferably, the amounts of the pure calcium oxide component and the anhydrite component fall in the ranges of 40 to 50 wt % and 40 to 50 wt %, respectively.

The flyash from a fluidized-bed boiler preferably has a fineness of 2,300 to 4,200 cm$^2$/g.

The flyash from a fluidized-bed boiler may be used in an amount of 0 to 10 wt % based on the total weight of the composition. The flyash from a fluidized-bed boiler is optionally used, and is thus either not included, or is included in an amount of 10 wt % or less. If the amount thereof exceeds 10 wt %, excess hydration heat may be generated upon construction of the refractory coating material, undesirably incurring cracking.

The expanded vermiculite in (e) is expanded vermiculite resulting from sufficient expansion at a high temperature, and functions to block hot air due to high-temperature flames in the event of a fire.

The expanded vermiculite includes 10 wt % or less of particles having a particle size less than 0.3 mm and 15 wt % or less of particles having a particle size greater than 4.0 mm. If the amount of the particles having a particle size less than 0.3 mm exceeds 10 wt %, the amount of fine powder is increased, making it impossible to exhibit sufficient fire resistance. On the other hand, if the amount of the particles having a particle size greater than 4.0 mm exceeds 15 wt %, the water content of the refractory coating material is increased, undesirably resulting in peeling of the coating material or deterioration in the strength of adhesion after construction.

The expanded vermiculite is used in an amount of 10 to 40 wt % based on the total weight of the composition. If the amount of the expanded vermiculite is less than 10 wt %, heat cannot be sufficiently blocked in the event of a fire. On the other hand, if the amount thereof exceeds 40 wt %, the strength of adhesion of the refractory coating material may decrease, undesirably resulting in peeling of the coating material.

Also, at least one selected from among calcium carbonate and limestone in (f) is decomposed due to high-temperature flames in the event of a fire, thus generating carbon dioxide, thereby helping to block flames and extinguish the fire.

Preferably, at least one selected from among calcium carbonate and limestone is used in an amount of 10 to 30 wt % based on the total weight of the composition. If the amount thereof is less than 10 wt %, the blocking of flames due to the generation of carbon dioxide through decomposition thereof in the event of a fire may become insignificant. On the other hand, if the amount thereof exceeds 30 wt %, the initial strength of adhesion of the refractory coating material may decrease.

The thickening agent in (g) functions to increase the viscosity of the refractory coating composition to thus enhance the adhesion. The thickening agent may include those known in the art, such as methyl cellulose, polyvinyl alcohol, pulp cellulose, etc.

The thickening agent is preferably used in an amount of 0.5 to 20 wt % based on the total weight of the composition.

According to the present invention, the refractory coating composition may further comprise those typically used in the art, such as a foaming agent, an adhesive, etc., in addition to the above constituents.

The refractory coating composition according to the present invention may be applied through any process known in the art, among which a spraying process is preferably utilized.

According to the present invention, the refractory coating composition may be employed as a refractory coating material for general buildings and a refractory coating material for petrochemical plants. The refractory coating material for general buildings is commercially available under the trade name "BOVIA 279", and the refractory coating material for petrochemical plants is commercially available under the trade name "BOVIA 271".

MODE FOR INVENTION

A better understanding of the present invention may be obtained via the following examples, which are set forth to illustrate, but are not to be construed as limiting the scope of the present invention. These examples may be appropriately altered or modified by those skilled in the art within the scope of the present invention.

Examples 1 to 3: Preparation of Refractory Coating Composition

The constituents shown in Table 1 below were mixed at the corresponding composition ratio (mixing ratio), thus preparing refractory coating compositions. The following composition ratios were set under the condition that the required fireproofing time was 3 hrs.

TABLE 1

| Material | Ex. 1 (Mixing ratio, wt %) | Ex. 2 (Mixing ratio, wt %) | Ex. 3 (Mixing ratio, wt %) |
| --- | --- | --- | --- |
| Typical cement | 28 | 30 | 22 |
| Ground-granulated blast-furnace slag | 20 | 25 | 27 |
| Flyash from fluidized-bed boiler | 3 | 5 | 7 |
| Mica | 5 | 7 | 10 |
| Calcium carbonate | 15 | 12 | 18 |
| Expanded vermiculite | 20 | 20 | 15 |
| Thickening agent | 9 | 1 | 1 |

Test Example 1: Heat-Shielding and Fire Resistance Testing

Figure 2:
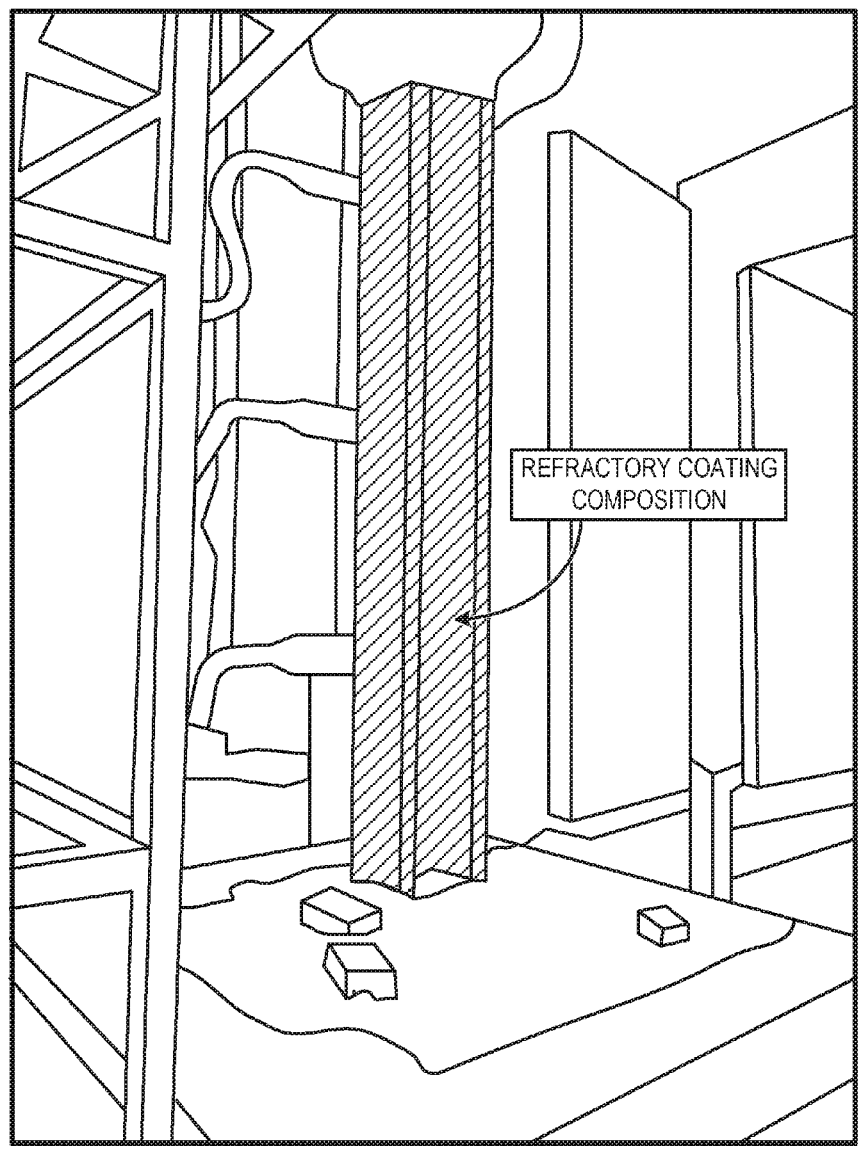
FIG. 2 is a drawing illustrating a fire resistance tester used in testing the refractory coating composition according to the present invention.
Figure 3:
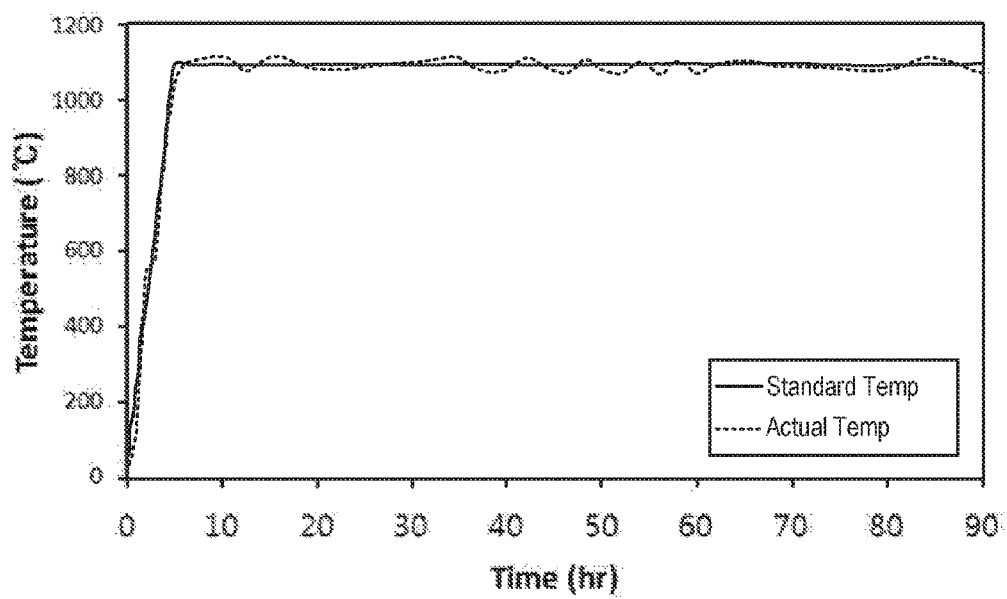
FIG. 3 is a graph illustrating the flame temperature inside the fire resistance tester used in testing the refractory coating composition according to the present invention.

As illustrated in FIG. 1, a commercially available steel structure was manufactured, and the refractory coating composition of each of Examples 1 to 3 was applied through spraying to a thickness of 2.8 cm thereon, after which the heat-shielding performance and fire resistance thereof were measured. The above thickness was an average value obtained by measuring the thicknesses at Positions 1, 2, 3, 4, 5, 6, 7, 8, 9, 10, 11, 12, 13, and 14 on the steel structure of FIG. 1. Specifically, as shown in FIG. 1, the temperature gauges were inserted at Positions 1, 2, 3, 4, 5, 6, 7, 8, 9, 10, 11, 12, 13, and 14 on the steel structure, after which the refractory coating composition of each of Examples 1 to 3 was applied and then dried, followed by fire resistance testing using the fire resistance tester of FIG. 2. The flame temperature inside the fire resistance tester was set as shown in FIG. 3.

Figure 4:
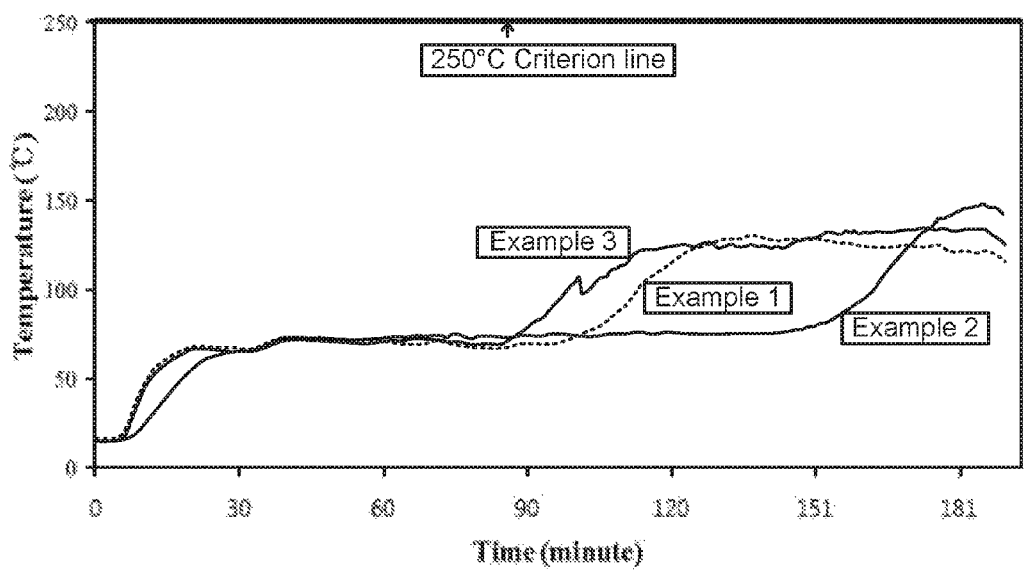
FIG. 4 is a graph illustrating the results of fire resistance testing of the refractory coating composition according to the present invention in Test Example 1.

The results of the fire resistance test are given in FIG. 4. As shown in the graph of FIG. 4, the refractory coating compositions of Examples 1 to 3 exhibited sufficient heat-shielding performance under the required fire resistance condition (a fireproofing time of 3 hrs). Even when high-temperature flame (about 1100° C.) was applied for 3 hrs to the refractory coating material according to the present invention, the maximum temperature of the steel structure was maintained at a level equal to or less than 300° C. Therefore, the refractory coating material according to the present invention manifested superior heat-shielding performance and fire resistance.

The invention claimed is:

1. A refractory coating composition, comprising:
based on a total weight of the composition,
(a) 20 to 40 wt % of cement;
(b) 15 to 40 wt % of ground-granulated blast-furnace slag;
(c) 5 to 20 wt % of at least one selected from among mica and alumina;
(d) 0 to 10 wt % of flyash from a fluidized-bed boiler;
(e) 10 to 40 wt % of expanded vermiculite;
(f) 10 to 30 wt % of at least one selected from among calcium carbonate and limestone; and
(g) 0.5 to 20 wt % of a thickening agent,
wherein the ground-granulated blast-furnace slag is slag obtained by quenching slag discharged from a blast furnace of an ironworks with water and has a fineness of 3,300 to 6,200 $cm^2/g$.

2. The refractory coating composition of claim 1, wherein the mica comprises any one or a combination selected from among muscovite and phlogopite as natural minerals, and contains 30 to 50 wt % of a silica component and 10 to 40 wt % of an alumina component.

3. The refractory coating composition of claim 1, wherein the alumina contains 80 to 95 wt % of a pure alumina component.

4. The refractory coating composition of claim 1, wherein the flyash from a fluidized-bed boiler is flyash obtained through desulfurization in a fluidized-bed boiler and comprises 30 to 60 wt % of a pure calcium oxide component, 30 to 60 wt % of an anhydrite component, and 5 to 15 wt % of an additional component other than the pure calcium oxide component and the anhydrite component, and has a fineness of 2,300 to 4,200 $cm^2/g$.

* * * * *